(12) United States Patent
Tran et al.

(10) Patent No.: US 6,307,738 B1
(45) Date of Patent: Oct. 23, 2001

(54) ELECTRONIC HOOD LOCK

(75) Inventors: Robin T. Tran, Houston, TX (US); Christopher Simonich, Hillsboro, OR (US); Michael R. Durham, Houston; Lee B. Hinkle, Tomball, both of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/144,306

(22) Filed: Aug. 31, 1998

(51) Int. Cl.⁷ ................................. G06F 1/16; H05K 5/00
(52) U.S. Cl. ............................................ 361/683; 361/724
(58) Field of Search ..................................... 361/724, 683, 361/684; 312/223.1; 29/832

(56) References Cited

U.S. PATENT DOCUMENTS

| 4,426,862 | | 1/1984 | Yamada et al. . |
| 4,937,560 | | 6/1990 | Nourmand . |
| 5,438,476 | * | 8/1995 | Steffes ................................. 361/683 |
| 5,606,615 | | 2/1997 | Lapointe et al. . |
| 5,841,631 | * | 11/1998 | Shin et al. ............................ 361/684 |
| 6,005,487 | * | 12/1999 | Hyatt, Jr. et al. ................ 340/825.31 |

* cited by examiner

*Primary Examiner*—Lynn D. Feild
(74) *Attorney, Agent, or Firm*—Conely, Rose & Tayon, P.C.

(57) ABSTRACT

A computer system which includes an electromagnetic hoodlock, and does not have any simple way to bypass the hood-lock The hoodlock consists of a spring-loaded solenoid, and is controlled by the system microprocessor. The system chassis may only be opened by a user with sufficient rights, after entering a password, or after an administrative command is sent over the computer network.

16 Claims, 3 Drawing Sheets

ELECTRONIC HOOD LOCK

BACKGROUND AND SUMMARY OF THE INVENTION

The present invention relates to a method of theft protection for computers and/or computer related hardware.

Background: High-Tech Equipment Theft

Physical computer equipment, and intellectual property stored on hard drives in computer systems, can be worth millions of dollars to the owner companies. Particularly where small, expensive, and portable computers are involved, asset management is becoming very difficult.

As computers have become more common, theft of the computers, of their components, and of information stored on them has become more prevalent. Employees continue to be the primary source for losses due to theft. For example, employees who have compatible systems at home may be tempted to swap boards and input devices at work to repair their systems at home. Employees are not the only threat. Repairmen, janitors, delivery-persons, other contractors, customers, invited guests, and even security people themselves have an opportunity to take computer property.

Size and portability are also factors. As integrated circuit manufacturers reduce the size of chips with a complementary boost in performance and power, the boxes into which the chips are placed become smaller. Grab-and-run thefts are likely to focus on the smallest equipment. As computer equipment continues to decrease in size (e.g. to sub-notebook and smaller computers), the vulnerability to theft increases. The reduction in size certainly seems to be the way of the future.

The increasing use of plug-and-play and hot-swappable units has been helpful for thieves, since these architectures have accelerated moves toward modular components which can be quickly attached or removed from a system.

Computers and related peripherals, and intellectual property are not the only target of high-tech theft. State-of-the-art instrumentation and test equipment are also prime candidates and are usually more expensive per unit volume than a typical home computer. Although less marketable than computer equipment, they can represent a sizeable loss to companies using such equipment.

Conventional Chassis Locks

Conventional desktop units currently include a mechanical lock of some sort, so that the chassis can be opened with a key or a special tool. This presents a dilemma: if the special tool is exotic, it adds to the cost of a technician's toolbox and increases the likelihood that a technician may not have the proper tool when he needs it; if the special tool is too common, the risk is that thieves will have it too. In many current systems, the special tool is simply a number 8 Torx™ driver, which is very widely available.

Further, for systems which key lock, key management is a significant issue. In today's world of large corporate networks, such a setup would be extremely cumbersome for information. Management departments managing thousands of machines. Whenever service was required, the correct key would have to be identified, or the systems would have to be left unlocked.

Smart Locks Lock-Protected System for Case Security

This application discloses a new way to prevent the opening of computers except by authorized personnel. This is accomplished by an electromagnetic "hoodlock," which prevents the computer's chassis from being opened unless the computer opens the hoodlock. The computer requires an administrator's password (which is not known to ordinary users) before it will allow the hoodlock to open. (Of course a chassis can always be opened by using destructive techniques, e.g. by drilling out screws, but the question is whether it can be opened by nondestructive techniques.)

This is an example of a smart lock. By allowing the computer to protect its own physical access, great flexibility in optimizing access security is obtained. According to the preferred embodiment, the system is equipped with an electronic hood lock used to prevent removal of the computer's cover. The lock is controlled electronically. An ASIC provides signals to both lock and unlock the hood lock solenoid. These signals are controllable by software through the Hood Lock Control register in the Client Management register set. Access to this register is protected.

An advantage of this is that it not only protects against thieves, it protects against uncontrolled hardware configuration changes (such as users moving boards or drives from one machine to another).

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

The hood lock operates by moving a solenoid, which is connected to a locking arm, into or out of a slot attached to the system's hood. When the locking arm is in the slot, the hood cannot be removed. A "lock" pulse will cause the locking arm to move into the slot. An "unlock" pulse causes the locking arm to retract from the slot, which frees the hood for removal.

The hardware control for the hood lock features a hardware timer designed to prevent solenoid damage from lock/unlock pulses of excessive duration. In addition, this frees the controlling software from having to time any pulses.

Figure 1:
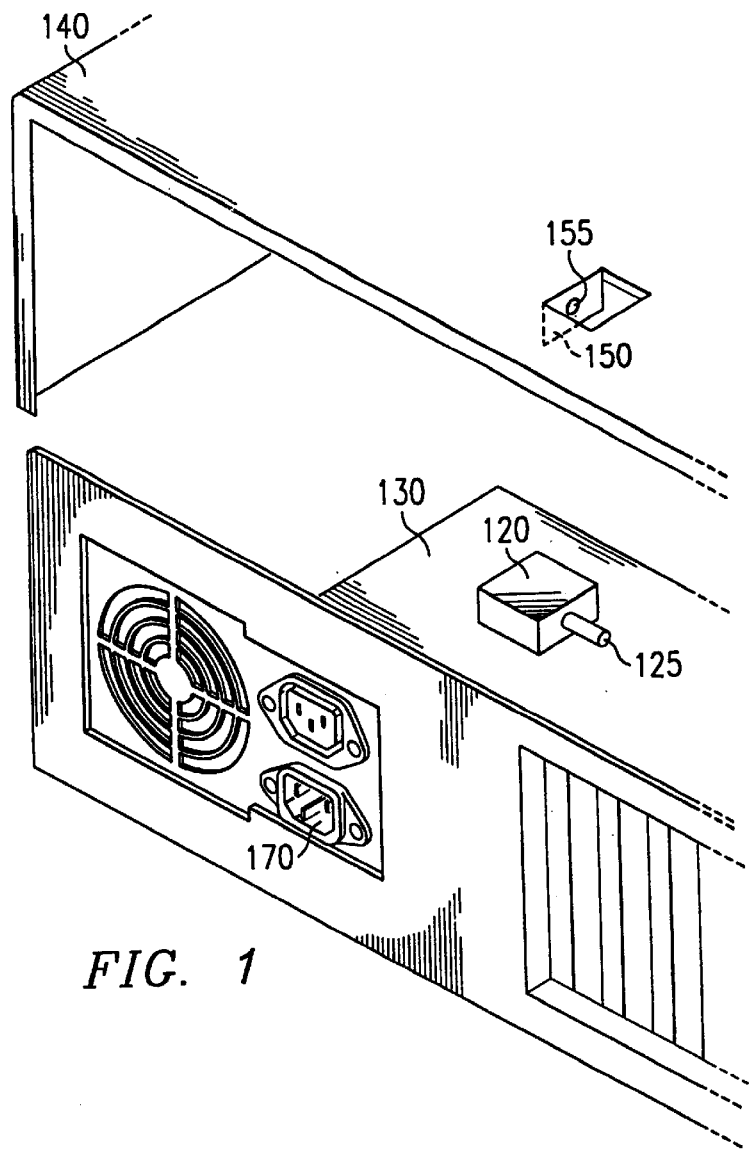
FIG. 1 shows the physical configuration of the computer with the case opened, showing the locking mechanism and the bypass power input.

FIG. 1 shows the physical configuration of the computer with the case opened, showing a solenoid 120, with a plunger 125 above the power supply 130. The hood 140 has an added tab 150 with a hole 155 in it. When the hood is in place, the solenoid plunger 125 extends through this hole 155 to lock the hood in position.

Figure 2A:
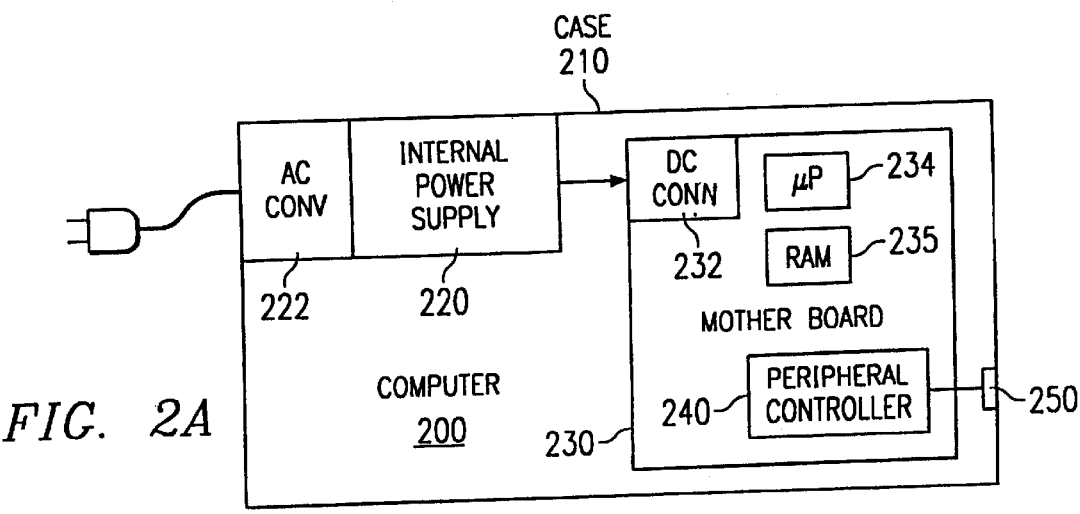
FIG. 2A shows a sample electrical configuration of some important parts of a computer system which includes a "hoodlock"

FIG. 2A shows a sample electrical configuration of some important parts of a computer 200 which includes a "hoodlock" 250. The case 210 encloses the motherboard 230 and power supply 220, as well as many other components not shown, such as a hard disk drive, removable media drives, I/O channel interfaces, and option cards if present. The motherboard 230 includes many key components of the computer. For example, the motherboard carries one or more microprocessors (or other processing units) 234, RAM 235, and a peripheral controller 240, as well as many others which are not shown. The peripheral controller 240 controls many peripheral interfaces, and also controls an electromagnetic lock 250 (preferably through a discrete FET, not shown). In the presently preferred embodiment, the lock 250 is simply a solenoid which is spring-loaded into the closed position, but of course other electromechanical configurations can be used instead. The power supply 220 preferably includes an AC connection 222, which permits power to be drawn from an AC power line, and provides power to a DC connector 232 on the motherboard.

Figure 2B:
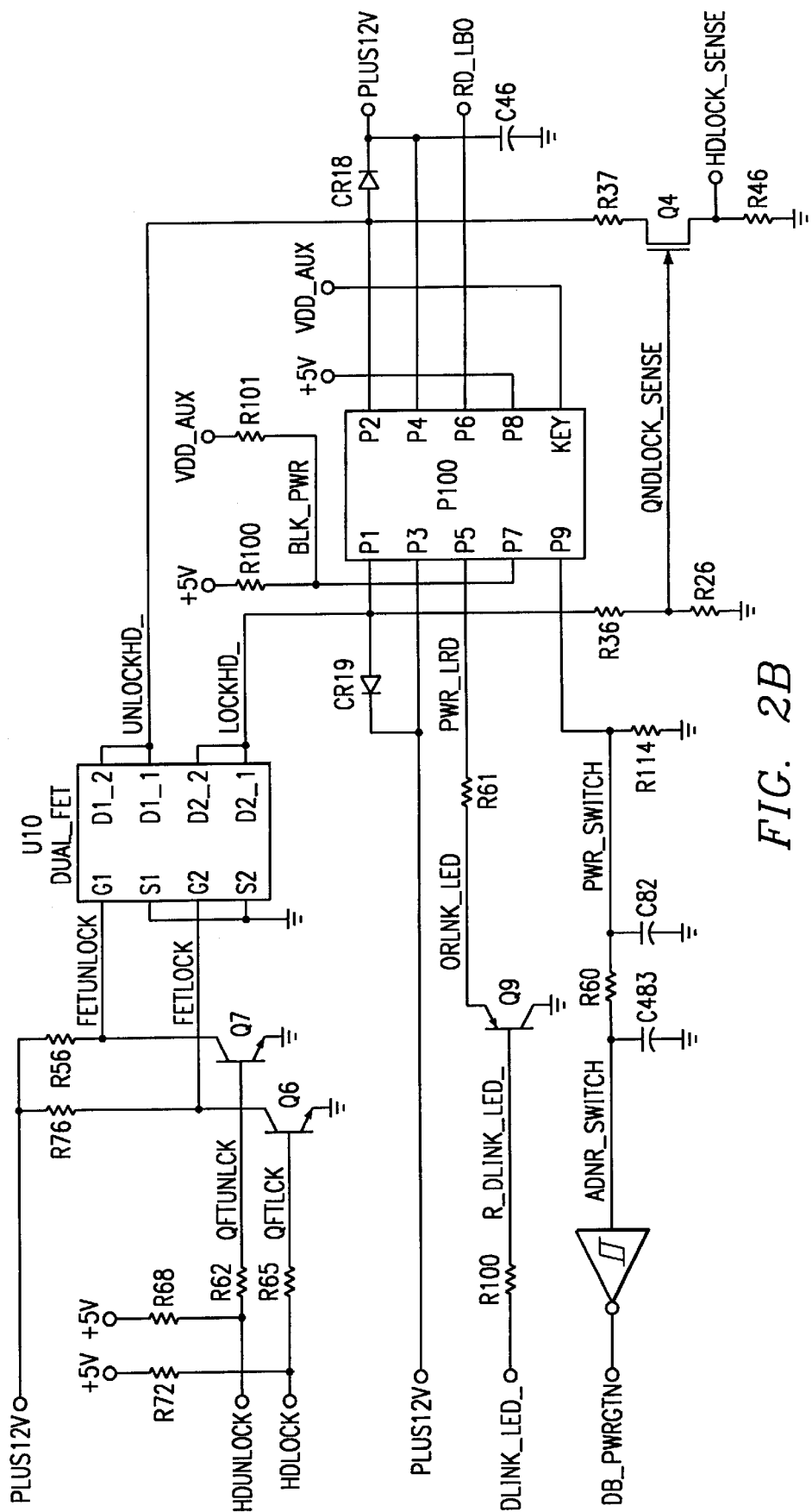
FIG. 2B is a schematic showing how the solenoid is controlled.

FIG. 2B is a schematic showing how the solenoid is controlled. HDUNLOCK and HDLOCK are outputs from an ASIC on the system board. These signals are activated by software registers. The ASIC circuitry ensures that the outputs do not remain asserted for longer than one second to protect the solenoid windings. The transistors and FETs provide isolation from the 5V ASIC and provide +12 volts at 1 amp.

The preferred embodiment still preferably provides some sort of a mechanical bypass, but it is not the first line of protection against a fault, and does not have to be easy to use. (For example, it may be accessed only by a nonstandard tool which is not commonly available, and which may not even be carried by technicians on normal service calls.)

In the presently preferred embodiment, mechanical bypass requires a special tool. This makes intrusion more difficult for casual intruders, while still providing a "last resort" method of entry where absolutely necessary.

Following are user directions for activating the locking feature of the locking computer system, in the presently preferred embodiment, during normal operation: Turn on the computer. When the F10 Setup message appears in the lower-right corner of the Compaq logo screen, press the F10 key. (If you do not press the F10 key while the message is displayed, you must turn the computer off, then on again to access the utility.) Press the Enter key to bypass the welcome screens and display the main menu. From the main menu, select Computer Setup, and press the Enter key. Select the Built-In Devices option. Select the Security Management option. Click the Advanced button. Locate the Smart Cover Lock option and select Locked to enable it, then select OK twice to exit the Advanced screen and the Security Management screen. Select File, Save Changes and Exit from the menu bar near the top of the screen.

Following are user directions for routinely unlocking the computer case, in a sample embodiment: run Computer Setup and selecting Unlocked at the Smart Cover Lock option. In case of hard drive failure, you can also unlock the lock by completing the following steps: During POST, press Ctrl+F10. (If you have established a setup password, enter this password when the prompt appears.) When the ROM-Based Setup Utility menu appears, select the Cover Lock Control option. Select Unlock. Select Save Changes and Exit to exit the utility.

Hood Lock Register Description Register Summary

TABLE 1

Hood Lock Register Summary
System Management Registers

| Address | R/W | Description | 7 | 6 | 5 | 4 | 3 | 2 | 1 | 0 |
|---|---|---|---|---|---|---|---|---|---|---|
| 0C50 | R/W | Index Register | | | | 0C50 index | | | | |
| 0C51 | R/W | Data Register | | | | data [7:0] | | | | |
| Address 0C50 Index | | | | | | | | | | |
| 0C51 | 14h | Hood Lock | — | — | Unlock pin | Lock pin | — | — | unlock oe | lock oe |

Hood Lock Register
I/O Address: 0C51
0C50 Index: 14h
Default Value: 00h
Attribute: Read/Write
Reset on: RESET
Writes to this register are blocked by the Vader-2 ASIC when Slot 2 of the Blackbox is "locked."

| Bit | Description |
|---|---|
| [7:6] | Reserved. Return 0 on read. |
| 5 | HDUNLOCK Pin<br>A read of this bit will return the current value of the HDUNLOCK pin. This bit is read only, writes will be ignored. |
| 4 | HDLOCK Pin.<br>A read of this bit will return the current value of the HDLOCK pin. This bit is read only, writes will be ignored. |
| [3:2] | Reserved. Return 0 on read. |
| 1 | HDUNLOCK OE.<br>Writing a '1' to this bit will unlock the electronic hood lock. Writing a '1' will cause the HDUNLOCK signal to be asserted (low) for approximately 0.75 seconds. Hardware will clear this bit (to a '0') when the 0.75 seconds has elapsed. Software may clear the bit early by writing a '0'. Writing a '1' to this bit while bit 0 of this register is a '1' is not allowed and will be blocked by hardware. This prevents software from attempting to lock and unlock the hood simultaneously. The write functions are:<br>1 = Assert HDUNLOCK signal (low).<br>2 = De-assert HDUNLOCK signal (high). |
| 0 | HDLOCK OE.<br>Writing a '1' to this bit will lock the electronic hood lock. Writing a '1' will cause the HDLOCK signal to be asserted (low) for approximately 0.75 seconds. Hardware will clear this bit (to a '0') when the 0.75 seconds has elapsed. Software may clear the bit early by writing a '0'. Writing a '1' to this bit while bit 1 of this register is a '1' is not allowed and will be blocked by hardware. This prevents software from attempting to block and unlock the hood simultaneously. The write functions are:<br>1 = Assert HDLOCK pin (low).<br>0 = De-assert HDLOCK pin (high). |

Figure 3:
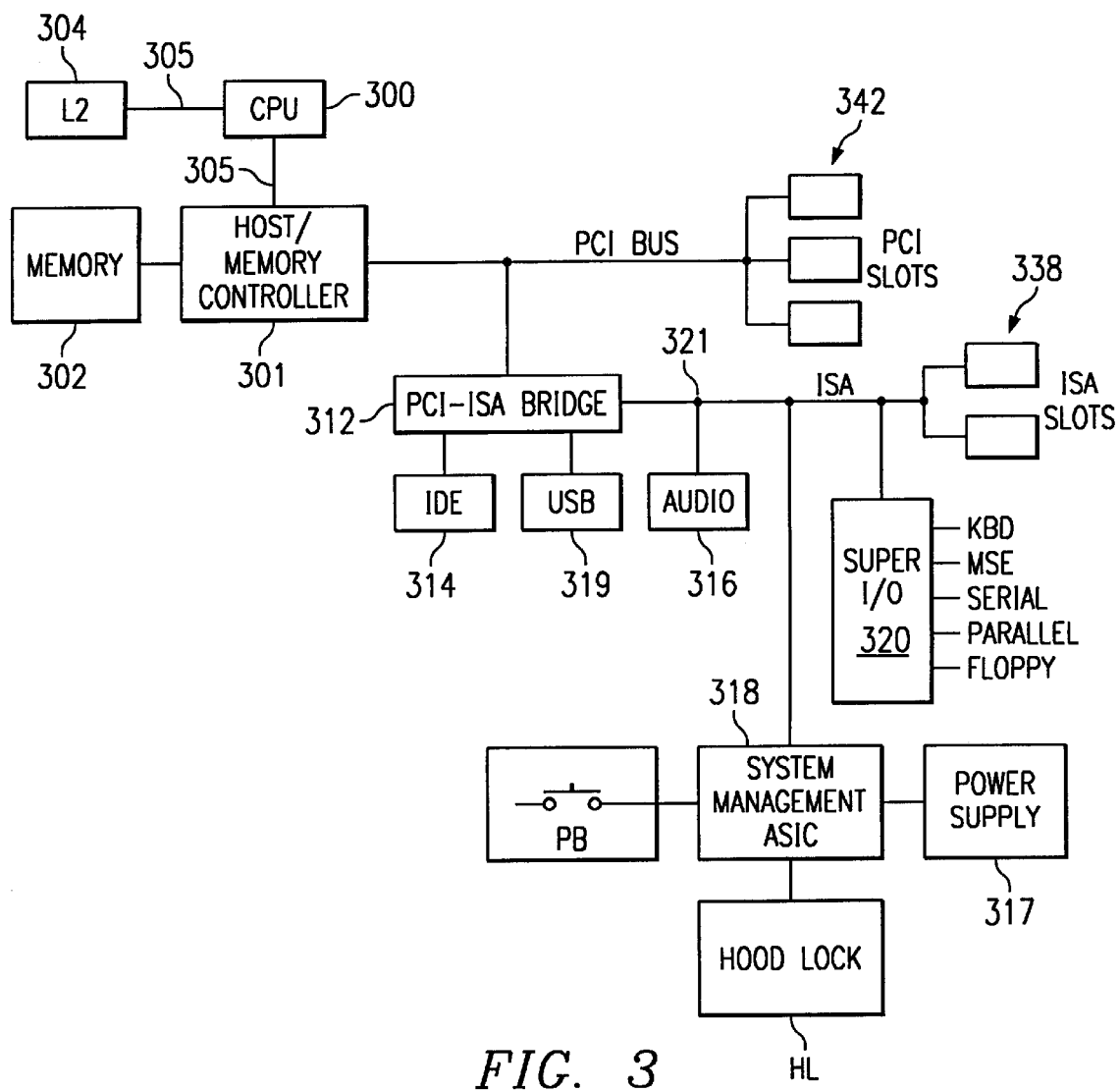
FIG. 3 shows a block diagram of a computer system according to the presently preferred embodiment.

FIG. 3 shows a block diagram of a computer system according to the presently preferred embodiment. The complete computer system includes, in this example:

A CPU 300 and a level two (L2) cache 304, which are connected to a high speed local bus 305. The processor 300 of the preferred embodiment is one of the 80X86 microprocessor family manufactured by Intel Corporation of Santa Clara, Calif. In the preferred embodiment, the processor operates with a standard IBM-PC compatible operating system, such as MS-DOS or Windows, available from Microsoft Corporation of Redmond, Wash. The L2 cache 304 provides additional caching capabilities to the processor's on-chip cache to improve performance.

In addition to the CPU 300 and cache 304, a host/memory controller 301 is connected between the local bus 305 and a PCI bus 306. This host/memory controller is also connected to memory unit 302.

The PCI bus 306 is also connected to a PCI/ISA bridge 312, which also provides various support functions to the system, and preferably the PCI/ISA bridge 312 is a single integrated circuit that acts as a PCI bus master and slave, an ISA bus controller, an ISA write posting buffer, an ISA bus arbiter, DMA devices, and an IDE disk controller. The PCI/ISA bridge 312 is connected to an IDE interface 314 and a Universal Serial Bus (USB) 319. The PCI/ISA bridge 312 is also connected to an audio board 316 as conventionally present in PC systems to provide sound communication capabilities for the system via a first ISA interface 321. The IDE interface 314 of the PCI/ISA bridge 312 drives one or more hard disk drives, preferably a CD-ROM player and a disk drive.

The PCI/ISA bridge 312 is connected to an I/O chip 320. The I/O chip 320 provides support for a parallel port, a serial port, a keyboard interface and a mouse interface, among others, for the computer system.

A system management ASIC 318, which in the preferred embodiment is a "Vader 2" ASIC, is operatively connected to I/O chip 312, and is also operatively connected to power button PB and power supply 317.

The PCI bus 307 is also connected to PCI slots 342. The plurality of IDE interfaces 314 on PCI/ISA bridge 312 provide the capability to expand the data storage capability of the system.

In this context, hoodlock HL is connected to the system management ASIC 318. Hoodlock HL is positioned to engage the door or cover of the system case, so that it is fastened shut unless the hoodlock solenoid is activated.

Alternative Embodiment Using Autonomous Diagnostic Chip

In an alternative embodiment, the hoodlock operation functions can be performed by an autonomous system monitoring chip (like the teleservicing chips from Dallas Semiconductor), instead of or in addition to the operation of the hoodlock by one of the chips on the motherboard. This provides additional protection against motherboard failure, since in systems which include such an autonomous monitoring chip the monitoring chip is carefully designed to stay active after motherboard failure.

Alternative Embodiment Using Remote Unlocking

In an alternative and less preferred class of embodiments, the software architecture can be configured to permit an unlocking command to be sent remotely over a network. If the lock is a solenoid, preferably the remote unlocking command merely enables a local unlocking operation.

Alternative Embodiment with both Electrical Bypass and System Power Bypass

In another alternative class of embodiments, an electrical (but not electronic) bypass is provided for the hoodlock. That is, an additional connector can be provided in a concealed or inconspicuous location, where a diode-isolated power input permits current to be applied directly to the lock solenoid. This is one way of providing a backup for the smart lock, but this is distinctly less preferred: first, the possibility of technicians poking around with powered jumper wires raises safety concerns; and secondly, the possibility of such a bypass operation reduces the security of the system.

Alternative Embodiment with Logic Supply Bypass and no other Mechanical or Electrical Bypass In this alternative embodiment, there is NO nondestructive mechanical or electrical bypass to activate the hoodlock. The only way to activate the hoodlock is through the operation of the system. This has the disadvantage that destructive methods must be used to open the case if total failure occurs, but security is increased.

Preferably this authentication circuit is implemented using a "black box" security controller chip, as described in the U.S. application Ser. No. 08/398,343 of Zinsky, Shaver, Kaiser and Rawlins, entitled "Security Control for Personal Computer"(filed Mar. 3, 1995), which is hereby incorporated by reference.

Further details of the system context, and of options for implementation, may be found in the books from MindShare, Inc., entitled PROTECTED MODE SOFTWARE ARCHITECTURE (1996), CARDBUS SYSTEM ARCHITECTURE (2.ed. 1996), EISA SYSTEM ARCHITECTURE (2.ed.), ISA SYSTEM ARCHITECTURE (3.ed.), 80486 SYSTEM ARCHITECTURE (3.ed.), PENTIUM PROCESSOR SYSTEM ARCHITECTURE (2.ed.), PCMCIA SYSTEM ARCHITECTURE (2.ed. 1995), PLUG AND PLAY SYSTEM ARCHITECTURE (1995), PCI SYSTEM ARCHITECTURE (3.ed. 1995), USB SYSTEM ARCHITECTURE (1997), and PENTIUM PRO PROCESSOR SYSTEM ARCHITECTURE (1.ed. 1997, 2.ed. 1997), all of which are hereby incorporated by reference, and in the PENTIUM PROCESSOR FAMILY DEVELOPER'S MANUAL 1997, the MULTIPROCESSOR SPECIFICATION (1997), the INTEL ARCHITECTURE OPTIMIZATIONS MANUAL, the INTEL ARCHITECTURE SOFTWARE DEVELOPER'S MANUAL, the PERIPHERAL COMPONENTS 1996 databook, the PENTIUM PRO PROCESSOR BIOS WRITER'S GUIDE (version 2.0, 1996), and the PENTIUM PRO FAMILY DEVELOPER'S MANUALS from Intel, all of which are hereby incorporated by reference.

According to a disclosed class of innovative embodiments, there is provided a computer system, comprising: one or more microprocessors, a user input device which is operatively connected to provide inputs to at least some ones of said microprocessors, memory which is connected to be read/write accessible by at least some ones of said microprocessors, and an output device connected to receive outputs from at least some ones of said microprocessors; an internal power supply connected to provide power to said microprocessors and said memory, said microprocessors, said memory, and said power supply all being enclosed in a case; wherein access to said case is controlled by an electromechanical lock; said lock being electronically controlled by a first lock-controlling one of said processors.

According to another disclosed class of innovative embodiments, there is provided a computer system, comprising: one or more microprocessors mounted on a system board; a user input device which is operatively connected to provide inputs to at least some ones of said microprocessors; a memory which is connected to be read/write accessible by at least some ones of said microprocessors; an output device connected to receive outputs from at least some ones of said microprocessors; a video display connected to display output from said system; an internal power supply connected to provide power to said microprocessors and said memory, at least one connector, operably connected to said system board to allow the connection of add-on devices; wherein said microprocessors, said memory, and said power supply are all enclosed in a single case; wherein access to said case is controlled by an electromechanical lock; said lock being electronically controlled by a control circuit.

According to another disclosed class of innovative embodiments, there is provided an electronic system, comprising: a first microprocessor and a user input device which is operatively connected to provide inputs to said first microprocessor; an internal power supply connected to provide power to said first microprocessor, said first microprocessor and said power supply being enclosed in a case; wherein access to said case is controlled by an electromechanical lock which is electronically controlled by said first microprocessor.

According to another disclosed class of innovative embodiments, there is provided a method of providing physical protection to a computer system, comprising: enclosing an internal power supply, a memory, and a first processor in a case, access to said case being controlled by an electromechanical lock; electronically controlling said lock with said first processor, which accepts data provided on an input to said first processor; only opening said lock, under the control of said processor, when a user of said system has sufficent access rights.

According to another disclosed class of innovative embodiments, there is provided a method of providing physical protection to an electronic system, comprising enclosing an internal power supply, a memory, and a first microprocessor in a case, access to said case being controlled by an electromechanical lock; electronically controlling said lock with said first microprocessor, which accepts data provided on an input to said first microproces; and only opening said lock, under the control of said first microprocessor, after a correct access code has been entered.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Of course, in implementing power supply circuits and systems, safety is a very high priority. Those of ordinary skill in the art will therefore recognize the necessity to review safety issues carefully, and to make any changes in components or in circuit configuration which may be necessary to improve safety or to meet safety standards in various countries.

In the sample computer system embodiment the user input devices can alternatively include a trackball, a joystick, a 3D position sensor, voice recognition inputs, or other inputs. Similarly, the output devices can optionally include speakers, a display (or merely a display driver), a modem, or other outputs.

What is claimed is:

1. A computer system, comprising:
    a microprocessor, a user input device which is operatively connected to provide inputs to said microprocessor, memory which is connected to be read/write accessible by said microprocessor, and an output device connected to receive outputs from said microprocessor;
    an interal power supply connected to provide power to said microprocessor and said memory, said microprocessor, said memory, and said power supply all being enclosed by a case; and
    an electromechanical lock electronically controlled by said microprocessor to lock and unlock said case at the direction of a user through application software, wherein said electromechanical lock can maintain the case in a locked position when said computer system is powered off.

2. The computer system of claim 1, wherein said electromechanical lock comprises a solenoid positioned to positively secure said case unless activated by said microprocessor.

3. The computer system of claim 1, wherein said electromechanical lock comprises a solenoid which is spring-loaded into the closed position.

4. The computer system of claim 1, further comprising an electrical bypass of said electromechanical lock to permit the lock to be unlocked.

5. The computer system of claim 1, further comprising a second microprocessor connected to a power supply separate from said internal power supply, wherein either of said microprocessors can open said electromechanical lock.

6. A computer system, comprising:
    a microprocessor mounted on a system board;
    a user input device which is operatively connected to provide inputs to said microprocessor;
    a memory which is connected to be read/write accessible by said microprocessor;
    an output device connected to receive outputs from said microprocessor;
    a video display connected to display output from said system;
    an internal power supply connected to provide power to said microprocessors and said memory;
    at least one connector, operably connected to said system board to allow the connection of add-on devices;
    wherein said microprocessor, said memory, and said power supply are all enclosed by a single hood;
    an electromechanical lock electronically controlled by a control circuit to lock and unlock said hood at the direction of a user through application software, wherein said electromechanical lock can maintain the case in a locked position when said computer system is powered off.

7. The computer system of claim 6, wherein said electromechanical lock comprises a solenoid positioned to positively secure said unless activated by said control circuit.

8. The computer system of claim 6, wherein said electromechanical lock comprises a solenoid which is spring-loaded into the closed position.

9. The computer system of claim 6, further comprising an electrical bypass of said electromechanical lock to permit the lock to be unlocked.

10. A method of providing physical protection to a computer system, comprising:
    a.) providing a hood to cover an internal power supply, a memory, and a processor, access to said case being controlled by an electromechanical lock;
    b.) electronically controlling said lock with said processor, which accepts data provided on an input to said processor;
    c.) only opening said lock, under the control of said processor and without the use of a key, when a user of said system has sufficient access rights; wherein said lock can maintain said hood in a locked position when said computer system is powered off.

11. The method of claim 10, wherein said computer system is a portable computer.

12. The method of claim 10, wherein said electromechanical lock comprises a solenoid which is spring-loaded into the closed position.

13. A method of providing physical protection to an electronic system, comprising:
   a.) enclosing an internal Power supply, a memory, and a first microprocessor in a case, access to said case being controlled by an electromechanical lock;
   b.) electronically controlling said lock with said first microprocessor, which accepts data provided on an input to said first microprocessor;
   c.) only opening said lock, under the control of said first microprocessor, after a correct access code has been entered without the use of a key; wherein said lock can maintain said case in a locked position when said electronic system is powered off.

14. The method of claim 13, wherein said electronic system is an alarm system.

15. The method of claim 13, wherein said electromechanical lock a solenoid which is spring-loaded into the closed position.

16. The method of claim 13, wherein said access code may be entered from a remote location.

* * * * *